3,044,992
COPOLYMERS OF MALEIC ANHYDRIDE WITH N-VINYL-CYCLIC CARBAMATES
Billy B. Hibbard, Midland, and Darrell D. Weage, Coleman, Mich., assignors to The Dow Chemical Company, Midland, Mich., a corporation of Delaware
No Drawing. Filed Apr. 4, 1960, Ser. No. 19,506
9 Claims. (Cl. 260—77.5)

This invention is concerned with novel copolymers and is particularly directed to copolymers of N-vinyl-cyclic carbamates with maleic anhydride and to the water-soluble salts thereof.

The novel compositions of the invention are copolymers of maleic anhydride with N-vinyl cyclic carbamates of the group consisting of N-vinyl-2-oxazinidinone and the substituted N-vinyl-2-oxazolidinones having the formula

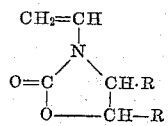

wherein one R is a methyl, ethyl or phenyl radical and the other R is hydrogen or a methyl radical, and the free acids and water soluble salts thereof obtained by hydrolysis of the acid anhydride rings in said copolymers.

The new copolymers thus may be represented as containing a plurality of recurring groups having the structure

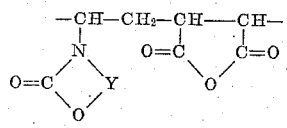

wherein Y is a divalent trimethylene radical or the divalent radical —RCH—RCH— in which the R's jointly have the aforementioned significance. It is to be understood that the new copolymers also include the free acids and water-soluble salts obtained by hydrolysis of the acid anhydride rings in the above structure. The new copolymers in the above anhydride form have little or no solubility in many organic solvents such as halogenated hydrocarbons, alkanols, alkyl ethers and alkyl esters of aliphatic acids while being somewhat soluble in solvents such as acetone, methyl ethyl ketone, dimethylformamide, dimethylsulfoxide and water. Salts such as the alkali metal and ammonium salts are prepared by opening the anhydride rings by reaction with aqueous alkali metal hydroxides or carbonates or ammonium hydroxide. Such salts are readily soluble in both cold and hot water whereas the polymers containing the unmodified anhydride moiety are soluble only in hot water with concurrent reaction to hydrolyze the anhydride form to the dibasic acid form. The copolymers containing equimolar proportions of the N-vinyl-cyclic carbamate and maleic anhydride constituents are preferred. It is among the advantages of the invention that the water-soluble forms of these copolymers are relatively stable when heated in aqueous solution.

The new copolymers may be prepared with a wide range of relatively high molecular weights. For example, such copolymers may be prepared having characteristic Fikentscher K values of from about 10 to about 100 or more. The new copolymers have found utilities in a wide variety of operations. For example, in the anhydride form, the copolymers may be employed as complexing agents to bind polar organic compounds. Such copolymers may also be incorporated in fiber-forming polymers based on acrylonitrile or vinyl or vinylidene chloride in amounts of from 5 to 30 percent by weight of the copolymer in such fiber-forming polymer to improve the dye receptivity of the fiber-forming polymer. The water-soluble forms of the new copolymers may be employed as bodying and wave-setting ingredients in cosmetic compositions applied to the hair and as sizing agents on textiles. Surprisingly, although the water-soluble forms of the new copolymers increase the viscosity of water when dissolved therein, they may be employed in amounts of from about 0.5 to 2 percent by weight in water-based drilling muds to reduce the viscosity thereof. Further, the new copolymers and particularly the water-soluble forms characterized by Fikentscher K values of less than 30 are excellent dispersing agents for finely-divided solids in water and may be employed to improve the stability of pigment slurries and paints.

The copolymers are prepared by contacting an N-vinyl-cyclic carbamate as defined above with maleic anhydride in a liquid medium under the influence of free radicals. In general, it is desirable to carry out the reaction in an inert organic solvent and to employ a peroxide catalyst or the like as a source of free radicals to initiate the reaction. In practice, it is preferred to employ the N-vinyl-cyclic carbamate and maleic anhydride reactants in substantially equimolar proportions although an excess of either reactant may be employed if desired. The reaction is initiated and proceeds readily when the reactants are mixed and heated with catalysts capable of liberating free radicals, preferably at temperatures of from about 35° to 120° C. Alternatively, free radicals may be generated in the reaction mixture by irradiation with ultraviolet light, X-rays or gamma rays.

Any suitable inert organic solvent may be employed in the reaction. In most instances, it is desirable to employ one or a mixture of aromatic hydrocarbons, such as benzene, toluene or xylene, or halohydrocarbons, such as methylene chloride or 1,2-dichloroethane, as the solvent. In such systems the reactants are soluble while the copolymer product precipitates as formed and may be recovered by filtration or decantation. Alternatively, solvents, such as acetone or methyl-ethyl ketone, in which the copolymer product is soluble, may be employed, in which case the copolymer product may be recovered by conventional processes such as by distilling off the solvent. In any case, it is generally desirable that the reactants be employed in an amount of from about 5 to 25 percent by weight of the solution in the original reaction mixture.

The reaction temperature will vary depending upon the concentration of reactants, the type and amount of catalyst, and the particular solvent or solvents employed. It is generally convenient to initiate the reaction at as low a temperature as the particular catalyst requires for producing an appreciable yield of free radicals and to complete the reaction at the boiling temperature of the solvent system employed. With highly active catalysts such as azobisisobutyronitrile the reaction may be initiated at temperatures of from 35° to 45° C. and completed by heating at such temperatures for a period of time. With less active catalysts, such as lauroyl peroxide, heating to a temperature of about 60° to 80° C. may be required for achieving an appreciable rate of reaction and the mixture may be heated at temperatures of from 80° to 120° C. to complete the reaction. In initiating reactions at temperatures above about 60° C., heating of the mixture should be gradual and controlled in order to avoid the sudden onset of polymerization at an uncontrollable rate.

Any suitable catalyst capable of yielding free radicals when heated in the reaction temperature range may be employed. Such catalysts include azo-compounds such as azobisisobutyronitrile and peroxides such as lauroyl peroxide, benzoyl peroxide, 2,4-dichlorobenzoyl peroxide, ditertiarybutyl peroxide, cumene hydroperoxide, tertiarybutyl hydroperoxide and the like.

The copolymerization reaction is conveniently carried out under normal atmospheric pressures although reaction under somewhat elevated or reduced pressures may be carried out if desired. Commercially available maleic anhydride sometimes contains appreciable quantities of free acid which may foster decomposition of the cyclic carbamate reactant when the reaction mixture is heated. The latter problem can be minimized by neutralizing the free acid, as, for example, by passing ammonia through the reaction mixture, before initiating the exothermic copolymerization.

The following examples illustrate the invention but are not to be construed as limiting the same.

Example 1

70.5 grams (0.555 mole) of N-vinyl-5-methyl-2-oxazolidinone and 54.5 grams (0.556 mole) of maleic anhydride were dissolved in 372 grams of methylene chloride and heated to a temperature of 41° C. with stirring and under reflux. To the resulting mixture, 3 grams of α,α'-azobisisobutyronitrile was added as polymerization catalyst. Stirring was continued while the reaction mixture was maintained at a temperature of about 41° C under reflux for about 48 hours. During the above period, polymerization, initiated by the catalyst, proceeded and the copolymer produced precipitated in the reaction mixture. On completion of the reaction, the copolymer product was separated by filtration, washed 3 times with methylene chloride and air dried to obtain 75 grams of copolymer product. This copolymer product was a substantially equimolar copolymer of vinyl-methyl-oxazolidinone and maleic anhydride characterized by a Fikentscher K value of 25 (determined by the method of H. Finkentscher, Cellulose Chemie 13, 58 (1932), using a one percent solution of the copolymer in 95 percent ethyl alcohol).

Example 2

73.8 grams (0.523 mole) of N-vinyl-5-ethyl-2-oxazolidinone and 51.2 grams (0.522 mole) of maleic anhydride were dissolved with heating and stirring in 372 grams of methylene chloride. The resulting mixture was heated under reflux as in Example 1 and 3 grams of α,α'-azobisisobutyronitrile added thereto. Heating at about 41° C. and stirring was continued for about 24 hours to complete the formation of the copolymer product which precipitated from the reaction mixture in large lumps. The product was washed and dried as in Example 1 to obtain 70 grams of washed and dried copolymer product. This copolymer product was a substantially equimolar copolymer of N-vinyl-5-ethyl-2-oxazolidinone and maleic anhydride.

Example 3

81.5 grams (0.831 mole) of maleic anhydride was dissolved in 937 grams of methylene chloride and the resulting solution was filtered to remove insolubles. To the filtered solution, 105 grams of N-vinyl-5-methyl-2-oxazolidinone was added. The resulting mixture was heated with stirring to a temperature of about 41° C. and 6.8 grams of α,α'-azobisisobutyronitrile added as catalyst. The mixture was maintained with stirring and under reflux at a temperature of about 41° C. for about 40 hours. Thereafter, the copolymer produced was separated by filtration, reslurried in methylene chloride and again filtered. The washed, solid product was dried in a vacuum oven to obtain a substantially equimolar copolymer of N-vinyl-5-methyl-2-oxazolidinone and maleic anhydride as a white solid in a yield of 92.5 percent of theoretical. The copolymer was characterized by a Fikentscher K value of 70.5.

Example 4

105 grams of N-vinyl-5-methyl-2-oxazolidinone and 81.5 grams of maleic anhydride were dissolved in 937 grams of toluene and 1.86 grams of lauroyl peroxide was added to the soution with stirring. The resulting mixture was heated gradually to a temperature of about 80° C. Thereupon an exothermic reaction was initiated and the temperature of the reaction mixture rose to about 100° C. Sufficient cold toluene was added to the mixture to lower the temperature to 92° C. and the reaction was continued at temperatures of from 92° to 102° C. for a period of about 30 minutes. During the above time, copolymer product precipitated from the reaction mixture. On completion of the reaction, the mixture was cooled and the copolymer product separated by filtration, washed and dried to obtain a copolymer characterized by a Fikentscher K value of 32.5. This copolymer was obtained in a yield of 99.5 percent of theoretical.

Example 5

The reaction mixture was prepared as in Example 3 except that 1.86 grams of benzoyl peroxide was employed as catalyst instead of the azo-catalyst employed in Example 3. The reaction mixture was heated under reflux at a temperature of about 41° C. for 48 hours. Thereafter the product was isolated by filtration, washed with methylene chloride and dried as in the preceding examples to obtain a substantially equimolar copolymer of N-vinyl-5-methyl-2-oxazolidinone and maleic anhydride in a yield of 92.7 percent based on theoretical and characterized by a Fikentscher K value of 34.5.

Example 6

279 grams of N-vinyl-5-methyl-2-oxazolidinone was dissolved in 2,486 grams of methylene chloride and 216 grams of commercial grade maleic anhydride added thereto with stirring. Ammonia gas was then bubbled through the resulting solution for several minutes and thereafter the solution was heated to about 41° C. and 18 grams of azobisisobutyronitrile added thereto. Polymerization was initiated when the azo-catalyst was added and heating with stirring was continued under reflux for a period of 48 hours. Thereafter the copolymer product was separated, washed and dried as in the preceding examples. This copolymer was characterized by a Fikentscher K value of 18.5 and was obtained in the yield of about 80 percent of theoretical.

Example 7

105 grams of N-vinyl-5-methyl-2-oxazolidinone and 81.5 grams of maleic anhydride were dissolved together in 937 grams of methylene chloride and the resulting mixture heated for 24 hours at temperatures of about 41° C. under reflux. At the end of this period there was no evidence of any polymerization having taken place. At this time, 0.93 gram of 2,4-dichlorobenzoyl peroxide was added as a catalyst and heating was continued at the above temperature for another 24 hours. Thereafter the copolymer product was separated, washed and dried as in the preceding examples to obtain a copolymer characterized by a Fikentscher K value of 46.3.

Example 8

105 grams of N-vinyl-5-methyl-2-oxazolidinone and 81.5 grams of maleic anhydride were dissolved in 937 grams of 1,2-dichloroethane. 0.74 gram of lauroyl peroxide was added to the mixture and the latter was then heated with stirring under reflux at temperatures of about 84° for a period of 5 hours. The copolymer product precipitated from the reaction mixture and was separated, washed and dried as in Example 3 to obtain a copolymer characterized by a Fikentscher K value of 39.0 in a yield of 80 percent of theoretical.

Example 9

36.5 pounds of a mixture of about 95 parts of N-vinyl-5-methyl-2-oxazolidinone and 5 parts of N-vinyl-4-methyl- 2-oxazolidinone and 28.25 pounds of maleic anhydride were dissolved by agitating with 200 pounds of methylene chloride in a 25-gallon stainless-steel mixing tank. The resulting solution was pumped into a jacketed 60-gallon stainless-steel clad reactor equipped with stirrer and reflux condenser and heated to 40° C. 1070 grams of $\alpha,\alpha'$-azobisisobutyronitrile was dissolved in about 5 gallons of methylene chloride and the resulting solution pumped into the reactor. The mixing vessels and lines were flushed with further methylene chloride to give a total of 325 pounds of this solvent in the reaction mixture. The jacket temperature was maintained at about 50° C. and the copolymerization reaction carried out under reflux for a total of 48 hours. However, periodic sampling of the reaction mixture indicated that the copolymerization was substantially complete after 28 hours. After the 48 hour heating period, stirring was discontinued and the slurry of copolymer product allowed to settle. The supernatant liquid was drawn off and the polymer product washed three times by reslurrying with fresh methylene chloride, settling and decanting. The washed product was dried in a vacuum oven at 50° C. for 12 hours to obtain the solid copolymer product. The latter was water-soluble and characterized by a Fikentscher K value of 27.

*Example 10*

62.5 grams of a mixture of 4- and 5-methyl-N-vinyl-2-oxazolidinone as in Example 9 and 49 grams of maleic anhydride were dissolved in 566 grams of acetone. 4.1 grams of azobisisobutyronitrile was added and the mixture heated under reflux at a temperature of about 56° C. for a period of about 23 hours. Thereafter the acetone was distilled off by sparging steam into the crude product mixture to obtain the desired copolymer in the form of an aqueous solution of the dibasic acid form in the steam condensate. This solution was neutralized with sodium hydroxide solution to a pH of 6 to 6.5 to convert the copolymer to the sodium-acid salt wherein one-half the carboxylic acid groups were converted to sodium carboxylates. This copolymer was characterized by a Fikentscher K value of 11.

*Example 11*

Ten grams of powdered titanium dioxide pigment was agitated with 190 milliliters of distilled water to prepare a substantially homogeneous suspension of the pigment. 90-milliliter portions of this suspension were placed in 100-milliliter graduated cylinders. To one such cylinder 5 drops (about 0.25 ml.) of an aqueous 25 percent by weight solution of a copolymer prepared as in Example 9 was added. This copolymer was characterized by a Fikentscher K value of 24.5 and was dissolved in sufficient dilute sodium hydroxide solution to produce the sodium salt form of the copolymer. The cylinder containing the treated suspension and the cylinder containing the untreated suspension were both inverted 10 times to insure thorough mixing and then placed upright to allow sedimentation to occur. In the untreated suspension the solids settled rapidly to leave a supernatant layer of clarified liquid while the treated suspension was stabilized and the solids settled only very slowly therefrom. The results are summarized in the following table:

| Settling Time Minutes | Volume of Clarified Supernatant Liquid | |
|---|---|---|
| | Untreated | Treated |
| 0 | 0 | 0 |
| 3 | 88 | 0 |
| 15 | 91 | 0 |
| 120 | 92 | 12 |
| 17 hours | 92 | 15 |

In an exactly similar determination only one drop of the above 25 percent copolymer solution was added to a further 90-milliliter portion of 5 percent by weight TiO$_2$ suspension. After mixing, followed by undisturbed settling for 15 hours, only 18 milliliters of clarified supernatant liquid had separated.

*Example 12*

0.508 gram of N-vinyl-2-oxazinidinone was dissolved in about 10 milliliters of methylene chloride. 0.392 gram of maleic anhydride was dissolved in a further similar portion of methylene chloride. The resulting solutions were mixed and heated to about 40° C. and about 0.03 gram of azobisisobutyronitrile added thereto. The resulting mixture was heated in a hot water bath until most of the methylene chloride had vaporized. Rapid copolymerization ensued to produce a vinyl-oxazinidinone-maleic anhydride copolymer as a yellow resinous solid. Infrared spectra of the latter confirmed its substantially equimolar copolymer nature. This copolymer product was insoluble in methylene chloride and soluble in acetone and in dilute aqueous sodium hydroxide solution. A portion of the copolymer product was washed with methylene chloride, dried and ground to a powder. The latter was dissolved in dilute aqueous sodium hydroxide solution to produce a solution containing about 10 percent by weight of the sodium salt form of the copolymer. 5 drops of the latter solution in 90 milliliters of aqueous 5 percent TiO$_2$ pigment suspension gave excellent dispersion and stabilization of the suspension similar to that obtained in Example 11.

*Example 13*

0.45 gram of N-vinyl-5-phenyl-2-oxazolidinone and 0.23 gram of maleic anhydride were separately dissolved in 5-milliliter portions of methylene chloride. The solutions were combined and heated and about 0.03 gram of azobisisobutyronitrile added as in the previous example. When most of the methylene chloride was distilled off, a rapid copolymerization reaction ensued to produce a vinyl-phenyl-oxazolidinone maleic anhydride copolymer as a yellowish crumbly solid, insoluble in methylene chloride and readily soluble in acetone and dilute sodium hydroxide solution. A solution of the sodium salt form of this copolymer was added to a TiO$_2$ suspension as in Example 11 in amount sufficient to provide about 0.5 percent by weight of copolymer based on the weight of TiO$_2$ solids in the suspension and found to provide excellent dispersion and stabilization of the suspension.

Other copolymers may be prepared in similar fashion by reacting N-vinyl-4,5-dimethyl-2-oxazolidinone with maleic anhydride. It will be noted that the copolymers of the invention are addition copolymers wherein polymerization has occurred through the ethylenic unsaturation in the respective monomers.

Other salts of the copolymers are prepared by dissolving the anhydride form of the copolymer in an aqueous solution of ammonium hydroxide or of an alkali metal hydroxide. Alternatively the anhydride form of the copolymer may be dissolved in hot water to form the free acid form of the copolymer and the latter is then neutralized in whole or in part with ammonia, ammonium hydroxide or an alkali metal hydroxide. Concentrated aqueous solutions containing from about 10 to 25 percent by weight of one of the copolymers in the salt form or acid-salt form are particularly adapted for incorporation in hydrocarbon latices such as styrene-butadiene latices to improve the rheology of such compositions and to serve as pigment dispersants in latex paints. In such uses the cyclic carbamate-maleic anhydride copolymer salt may be added prior to or during the polymerization reaction in which the latex is formed.

We claim:

1. Copolymers of maleic anhydride with an N-vinyl cyclic carbamate selected from the group consisting of N-vinyl-2-oxazinidinone and substituted N-vinyl-2-oxazolidinones having the structure:

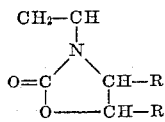

wherein one R is selected from the group consisting of methyl, ethyl and phenyl radicals and the other R is selected from hydrogen and a methyl radical, and the free acids and water-soluble salts thereof obtained by hydrolysis of the acid anhydride rings, said copolymers being characterized by Fikentscher K values of at least about 10.

2. The alkali metal salts of the copolymers of claim 1.

3. A copolymer in accordance with claim 1, characterized by a Fikentscher K value of from about 10 to about 100.

4. An addition copolymer of maleic anhydride and N-vinyl-5-methyl-2-oxazolidinone.

5. A water-soluble sodium salt of a copolymer of maleic anhydride and N-vinyl-5-methyl-2-oxazolidinone.

6. An addition copolymer of maleic anhydride and N-vinyl-5-ethyl-2-oxazolidinone.

7. An addition copolymer of maleic anhydride and N-vinyl-5-phenyl-2-oxazolidinone.

8. Copolymers of maleic anhydride with an N-vinyl cyclic carbamate selected from the group consisting of N-vinyl-2-oxazinidinone and substituted N-vinyl-2-oxazolidinones having the structure:

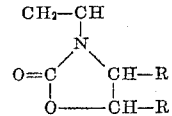

wherein one R is selected from the group consisting of methyl, ethyl and phenyl radicals and the other R is selected from hydrogen and a methyl radical, wherein the moieties derived from the cyclic carbamate and the maleic anhydride are incorporated in substantially equimolar proportions, and the free acids and water-soluble salts thereof obtained by hydrolysis of the acid anhydride rings, said copolymers being characterized by Fikentscher K values of at least about 10.

9. An addition copolymer of maleic anhydride and N-vinyl-2-oxazinidinone.

References Cited in the file of this patent
UNITED STATES PATENTS

| | | |
|---|---|---|
| 2,652,380 | Hedrick et al. | Sept. 15, 1953 |
| 2,818,399 | Drechsel | Dec. 21, 1957 |
| 2,919,279 | Walles et al. | Dec. 29, 1959 |